Figure 4:
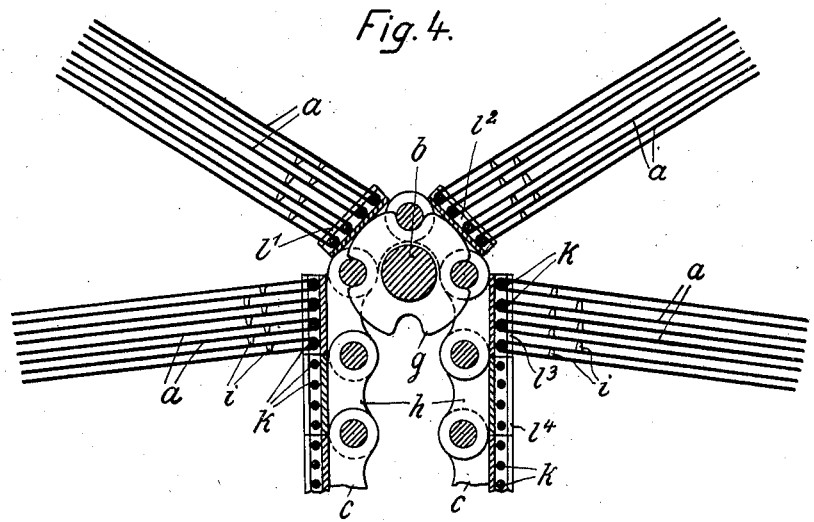

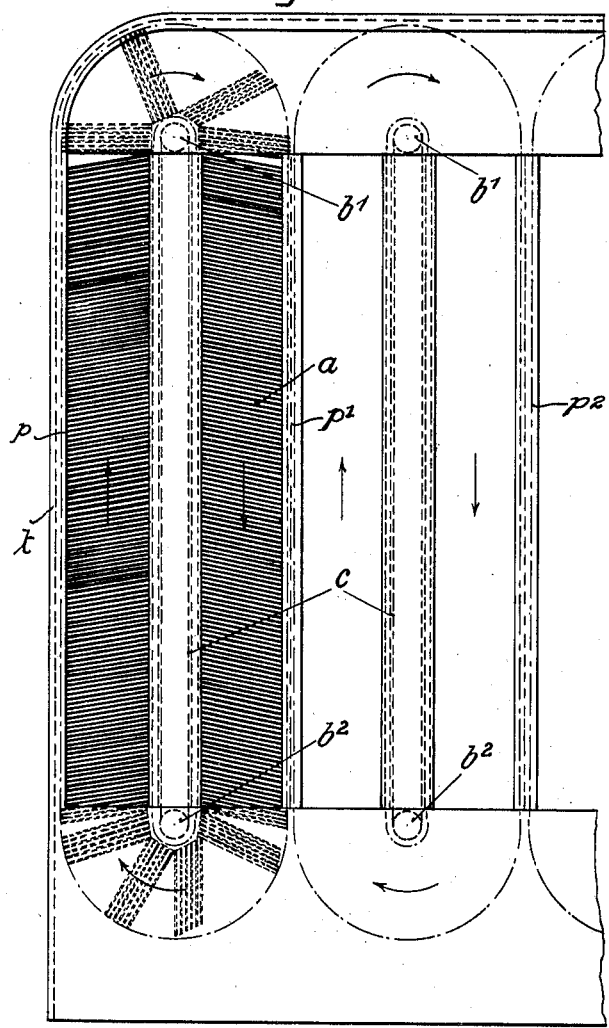
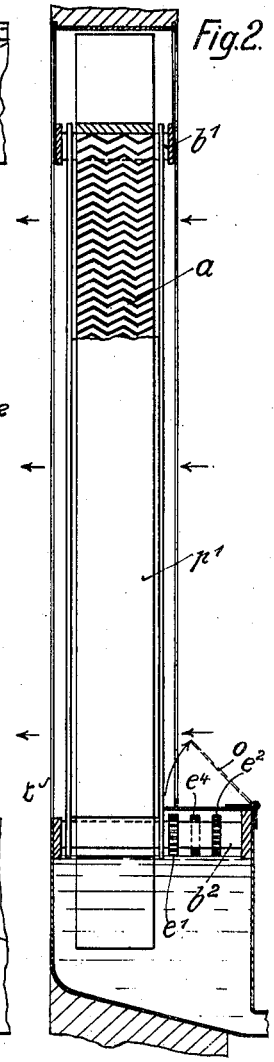
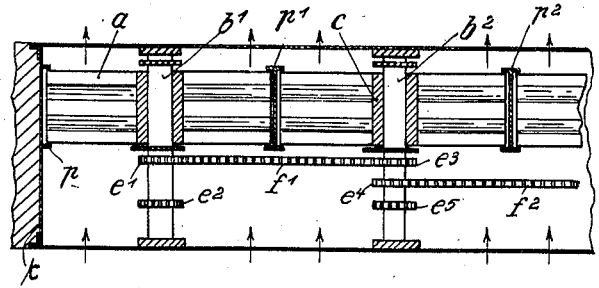

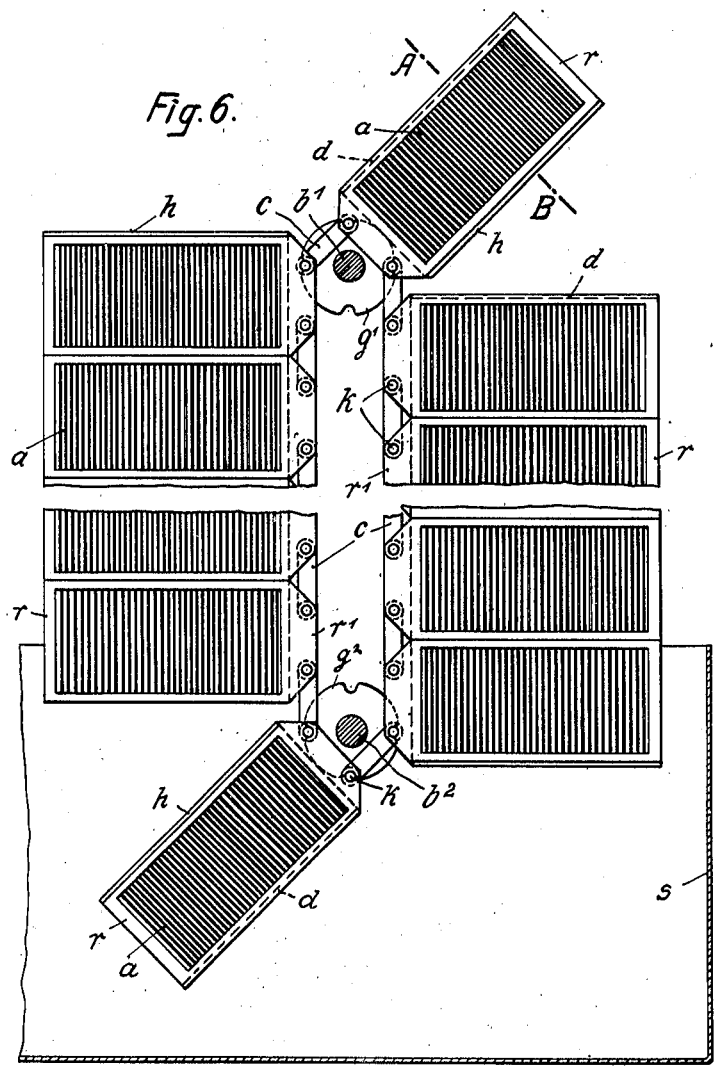
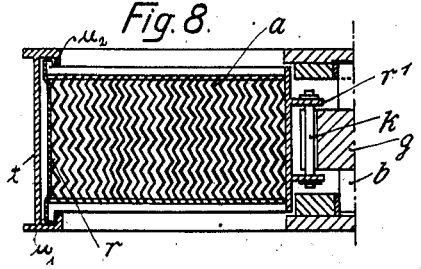
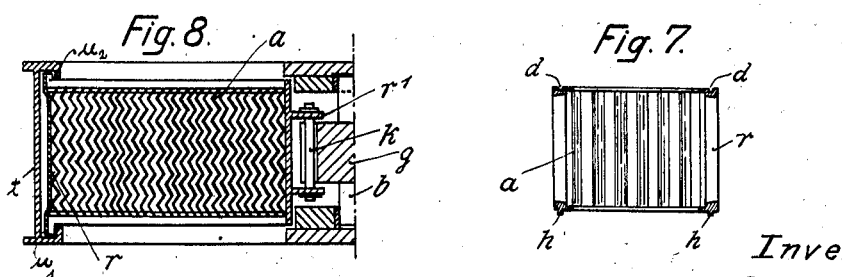

Patented Nov. 10, 1931

1,831,369

UNITED STATES PATENT OFFICE

ALOIS SCHIRP, OF ESSEN, GERMANY

ROTATABLE PLATE TYPE FILTER FOR GASES

Application filed October 29, 1928, Serial No. 315,774, and in Germany January 7, 1928.

The invention relates to a rotatable plate type filter for gases composed of layers of section plates which are slightly moistened.

The rotary air filters already proposed consisted of strips of different thickness and rotated on shafts disposed transversely in relation to the main direction of flow of air, so that, by comparison with a stationary filter, the movable purifying plant displayed a substantially great constructional height, thereby increasing the cost of installation and the consumption of oil. If the thickness of the filter were reduced, there still remained the substantial defect that, with the direction of rotation of the filter from the contaminated air space to the purified air space (upwards), the front side of the filter—most heavily laden with dust—became the discharge zone for the pure air, thus giving rise to the danger that a considerable amount of previously deposited dust was liable to be carried away again by the air. If on the other hand, the air purifier were moved from the purifying bath towards the pure air side (downwards), the defect arose that freshly oiled parts were exposed to the current of pure air and could permeate the latter.

One object of the invention is to provide a rotatable gas filter whose plane of rotation lies transversely to the direction of the gas flow, which occupies no more height than an ordinary one, and at the same time reduces the intermediate or non-functioning gas spaces in the apparatus to a minimum; the intermediate spaces being utilized to accommodate transmission gear, cranks etc. Another object of the invention is to provide a gas filter of the rotatable type which is easily assembled and which provides a firm mounting for the filter plates.

Another object is to provide a rotatable gas filter which can be easily, and at the same time thoroughly, cleaned and which can be well moistened.

Further objects will appear from time to time in the description hereinafter given with reference to the accompanying drawings.

According to this invention, the gas purifier is led over axes situated in or parallel to the main direction of the flow of the gas. The invention preferably makes use of shafts of small diameter, for the simple reason of reducing as far as possible the space, unusable for purifying the gas, between two adjacent filtering layers, and to spread the members of the filter as far apart as possible when in the reversing poistion, i. e. when being turned over.

According to one embodiment of the invention, the filtering medium consists of plates which rest, on the one side, on a guide or chain which is led over the shafts, and on the other side slide in packings. For the embodiment according to the invention, use is preferably made of plates, known per se, of slightly corrugated cross section, which are mounted so as to slope towards the free end, in order that any excess of the moistening agent may flow in that direction. Nevertheless, in some cases, the slope may be in the opposite direction, or the two sides of the endless series of plates may slant in opposite directions. The direction of rotation of the filter is immaterial, and is of equal value so far as the purifying effect is concerned.

I will now describe some embodiments of my invention as applied to the filtration of air, by way of example, with reference to the accompanying drawings whereon:—

Fig. 1 is a diagrammatic front elevation of a plurality of endless plate filters, erected side by side, the unseen parts being indicated by broken lines.

Figure 5:
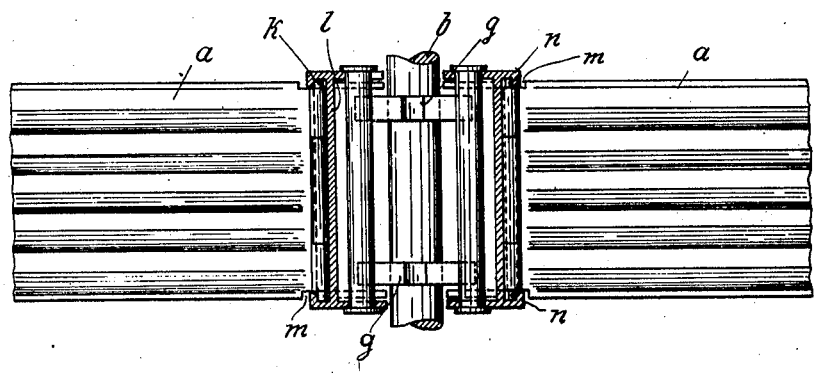

Fig. 2 is a longitudinal section through the apparatus according to Fig. 1. Fig. 3 is a horizontal cross section through the filter according to Fig. 1. Fig. 4 is an enlarged partial view of the chain, provided with the filter packs according to Fig. 1, and in partial section in order to show the method of mounting and actuating the plates. Fig. 5 is a plan of Fig. 4, in partial section and with a portion cut away. Fig. 6 is a front elevation of another type of filter, the air-supply passages and packing means being omitted. Fig. 7 is a section along VII—VII of Fig. 6, for the purpose of showing the design of the frames. Fig. 8 is a horizontal section through a filter frame with means for fastening same.

With reference to Figs. 1 to 5:—

The slightly corrugated plates $a$ are superimposed on the flat side in Fig. 1, and are hinged on one side to pins $k$. The plates have a slight slope towards the free sides, which slide in packings $p:p^1:p^2$, so that any of the moistening liquid which may collect on the lowest part of the plates can run off without exposure to the flow of air, and contribute to the lubrication of the sliding surfaces. Uniform spacing of the plates $a$ is assured by punched projections $i$, whilst, for the rest, the plates lie rigidly as the result of their sectional form.

The endless chain $c$ on which the plates rest is mounted on short shafts $b:b^1:b^2$, in the main direction of flow of air. These shafts may also have short stubs projecting on the outside and on which are mounted members of the actuating mechanism, such as pinions $e^1$ to $e^5$, and driving chains $f^1:f^2$ (Figs. 2 and 3).

In detail, the chain is preferably designed as a plate chain with short link members $l^1$—$l^4$ etc. The pivot pins $k$ of the plates $a$ are mounted on the backs of the link plates $l^1$ etc., whereas the actual chain links $h$ travel, by means of their bolts, round the sprockets $g$, etc., on the shafts $b:b^1:b^2$ etc. It is desirable that two plates $a$ should be mounted on each pivot pin $k$. Moreover, the articulation of the plates $a$ can be effected, in known manner, so that the plates are easily taken out. In many cases it is advisable to provide the parts of the plates $a$ adjacent to the chain plates, with grooves $m$, Fig. 5, which are covered by packing surfaces $n$, for the dual purpose of preventing the passage of adjacent air to the driving mechanism, and to limit the slope of the plates.

In the upper and lower part of the endless bands, the plates spread apart owing to the small diameter of the chain sprockets $g$, and can be cleaned, either by means of stagnant liquids, or by compressed air, in known manner. According to Figs. 1 and 2, a cleaning trough with stagnant liquid is provided underneath.

In many instances it is preferable to allow the driving mechanism $e^1$—$e^5$, $f^1:f^2$ etc., and also $b^1$ etc. to dip into the upper part of this liquid tank. In such case, the driving mechanism is protected from the outside air by a valve $o$, but is, nevertheless, easily accessible.

With reference to Figs. 6 to 8:—

As can be seen from Figs. 6 to 8, filter plates $a$, of known, slightly corrugated form are disposed vertically, in packs, in frames $r$, and also vertically in relation to the direction of charging the filter. The rear portion of each frame is provided with flanges $r^1$, having eyes for articulating the frames to chain members $c$ by means of pins $k$.

The chain formed by the alternating serially disposed flanges $r^1$ and chain members $c$, passes round an upper chain sprocket $g^1$ and a lower one $g^2$, which are adapted to be rotated, individually or jointly, by the actuation of their shafts $b^1$ or $b^2$.

In the operative position, the relatively freely movable frames $r$ fit close together by means of grooves $d$ and tongues $h$. In their uppermost and lowermost positions, in which they are separated from one another, the frames may travel through vessels such as $s$. Fig. 6 shows only a lower vessel, which is usually sufficient. The method of packing the filter in relation to the walls of the passage is of the usual kind.

In operation, the dust settles down between the walls of the plates $a$. When the filter wall approaches its lowest position, the frames separate. The smaller the chain sprocket, the wider the relative angle assumed by the frames and therefore the greater the skimming and rinsing movement of the frames $r$ through the vessel $s$ charged with the cleansing liquid. Moreover, the rinsing movement can be extensively influenced by modifying the travel of the filter according to the kind of the deposited dust. The special manner of utilizing the reversing movement, enables about five times the quantity of oil contained in a filter frame to be forced, in a positive manner, therethrough, in a very short path—which must be provided in any event—and thereby detach and flush away the deposited dust completely.

Since, under proper working conditions, a filter frame retains about 2 litres of oil, a five-fold quantity of cleansing liquid that is a quantity of 10 litres, is thus pressed through it. After leaving the dipping bath, the plates again assume the perpendicular position, so that the newly moistened members very quickly drain and reach the working portion of the passage in condition for use. If, nevertheless, portions of the moistening liquid be still present in excess in the filters, such portions are able to find their way downwards all the way up the filter wall, without being impeded by intermediate partitions. A small portion of the liquid collects in the grooves $d$ between the frames, and serves to improve the packing action.

The frames $r$ can be guided in the packings $t$, either, according to Fig. 8, by providing the frames $r$ with lateral projections $u_1$ and $u_2$, which are guided in grooves in the packing $t$; or the frame $r$ may be provided, in place of the projections, with rollers which serve to lessen any friction occurring, and utilize the inner surfaces of the packing $t$ as rails.

The plate frames can be of any desired construction, for example, partially or wholly as a chill casting. The frame or packing in which they move may, in simple cases, such as shown in Fig. 3, consist of a channel iron which, as shown in Fig. 1, is suitably bent at the top so as to provide close guidance even at the points of reversal; or, as shown in Fig. 8, a section provided with several bends may be employed.

The combination of the several adjacently disposed filters, for the purpose of joint drive, is effected in known manner, for example, by the cone pinions which are connected, at one end of the filters, (also by means of a cone pinion) to a gear box giving a ratio of transmission of 1:20.

In large air-filter plants, for example, batteries for purifying 50,000 cu. metres and more per hour, it is advisable to replace manual drive by a motor and transmission gear, so that no attendance whatever is needed for the filter. With regard to the gear, a transmission ratio of 1:84,000 has been found particularly suitable. The gear mechanism may be employed, as shown in Figs. 2 and 3, or in like manner, so that it can run for a year or more without requiring attention.

While I have described preferred embodiments of my invention, it will be understood that modifications may be made and that no limitations upon the invention are intended other than those imposed by the scope of the appended claims.

I claim:—

1. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups.

2. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means for cleaning and moistening said filter plates.

3. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said groups of filter plates whereby they (the groups) project at approximately 90° to the direction of movement of the articulated members.

4. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said groups of filter plates whereby they (the groups) project at approximately 90° to the direction of movement of the articulated members; means for cleaning and moistening said filter plates.

5. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said groups of filter plates whereby they (the groups) project at approximately 90° to the direction of movement of the articulated members; means for guiding and packing the extremities of said filter plates during their movement.

6. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said groups of filter plates whereby they (the groups) project at approximately 90° to the direction of movement of the articulated members; means for guiding and packing the extremities of said filter plates during their movement; means for cleaning and moistening said filter plates.

7. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said filter plates whereby they (the plates) project at approximately 90° to the direction of movement of the articulated members; means on the filter plates for spacing said plates apart relative to each other.

8. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members to carry said filter plates whereby they (the plates) project at approximately 90° to the direction of movement of the articulated members; punched projections on each filter plate to space it from the next one.

9. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; means on said articulated members adapted to carry said filter plates so that, except at the upper reversing position, said plates always slope downwardly towards their tips.

10. A filter for filtering a gas, comprising in combination; an endless articulated conveyor movable in a plane transverse to the flow of the gas; two horizontal, vertically superposed shafts for mounting said conveyor; one sprocket wheel on each of said shafts for transmitting motion to said conveyor; a plurality of filter plates carried in groups by said conveyor and adapted to spread apart during reversal of the motion of the latter.

11. A filter for filtering a gas, comprising in combination; an endless articulated conveyor movable in a plane transverse to the flow of the gas; two horizontal, vertically superposed shafts for mounting said conveyor; one sprocket wheel on each of said shafts for transmitting motion to said conveyor and of small diameter relative to the length of the articulated members of the conveyor; a plurality of filter plates carried in groups by said conveyor and adapted to spread apart during reversal of the motion of the latter.

12. A filter for filtering a gas, comprising in combination; an endless conveyor movable in a plane transverse to the flow of the gas; means for mounting said conveyor; means for transmitting motion to said conveyor; a plurality of filter plates carried by said conveyor and adapted to spread apart during reversal of the motion of the latter; a series of articulated members forming said conveyor and carrying the filter plates in groups; a trough at the lower end of said conveyor and containing liquid for moistening and cleaning the filter plates.

13. A filter for filtering a gas, comprising in combination; an endless conveyor movable in a plane transverse to the flow of the gas; means for mounting said conveyor; means for transmitting motion to said conveyor; a plurality of filter plates carried by said conveyor and adapted to spread apart during reversal of the motion of the latter; a series of articulated members forming said conveyor and carrying the filter plates in groups; a trough at the lower end of said conveyor and containing liquid for moistening and cleaning the filter plates; driving mechanism for the conveyor located in the upper part of said trough.

14. A filter for filtering a gas, comprising in combination; an endless conveyor movable in a plane transverse to the flow of the gas; means for mounting said conveyor; means for transmitting motion to said conveyor; a plurality of filter plates carried by said conveyor; a series of articulated members forming said conveyor and carrying the filter plates in groups; horizontal rods on said articulated members, said filter plates being clamped to said rods whereby the filter plates project at approximately 90° to the direction of movement of the articulated members.

In testimony whereof I affix my signature.
ALOIS SCHIRP.